US 8,520,781 B2

(12) United States Patent
Weng et al.

(10) Patent No.: US 8,520,781 B2
(45) Date of Patent: Aug. 27, 2013

(54) SYSTEM AND METHOD FOR CHANNEL ESTIMATION

(75) Inventors: Jianfeng Weng, Kanata (CA); Jason Robert Duggan, Ottawa (CA); Edgar Filiberto Velez, Kanata (CA); Martin Kosakowski, Bochum (DE); John Puthen Panicker, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 499 days.

(21) Appl. No.: 12/846,448

(22) Filed: Jul. 29, 2010

(65) Prior Publication Data
US 2012/0027140 A1 Feb. 2, 2012

(51) Int. Cl.
*H04L 1/00* (2006.01)

(52) U.S. Cl.
USPC ......................................................... 375/340

(58) Field of Classification Search
USPC .................. 370/339, 330, 342, 479; 375/220, 375/224, 230, 232, 260, 316, 340, 349, 350; 455/226.1, 458, 574; 714/748
See application file for complete search history.

(56) References Cited

U.S. PATENT DOCUMENTS

| 2004/0208267 A1* | 10/2004 | Lee ............................... 375/354 |
| 2005/0030886 A1* | 2/2005 | Wu et al. ....................... 370/206 |
| 2005/0213679 A1* | 9/2005 | Yamagata ..................... 375/260 |
| 2005/0265490 A1 | 12/2005 | Sestok, IV et al. |
| 2008/0240265 A1 | 10/2008 | Fechtel |
| 2009/0323790 A1* | 12/2009 | Yousef .......................... 375/224 |

FOREIGN PATENT DOCUMENTS

EP      1580948 A2      9/2005

OTHER PUBLICATIONS

European Patent Office, European Search Report, Application No. EP 10 17 1305, Mar. 18, 2011.

* cited by examiner

*Primary Examiner* — Sam K Ahn
*Assistant Examiner* — Shawkat M Ali
(74) *Attorney, Agent, or Firm* — Quarles & Brady LLP

(57) ABSTRACT

A method for channel estimation includes receiving data at a number of frequency intervals in a frequency band over a number of first time intervals. A first set of channel estimates is determined for each pilot symbol within the data over a second time interval comprising at least one first time interval, and time-direction interpolation is performed to determine a second set of channel estimates for a number of data portions in a frequency interval using the first set of channel estimates. The frequency interval comprises a data portion comprising a pilot symbol. Frequency-direction interpolation is performed to determine a third set of channel estimates for each first time interval. The time-direction interpolation and the frequency-direction interpolation can be performed in reverse order with the channel estimates generated by the frequency-direction interpolation being used as inputs for time-direction interpolation.

26 Claims, 10 Drawing Sheets

SYSTEM AND METHOD FOR CHANNEL ESTIMATION

BACKGROUND

The present invention relates generally to data transmission in mobile communication systems and, more specifically, to channel estimation.

As used herein, the terms "user equipment" and "UE" can refer to wireless devices such as mobile telephones, personal digital assistants (PDAs), handheld or laptop computers, and similar devices or other User Agents ("UAs") that have telecommunications capabilities. In some embodiments, a UE may refer to a mobile, wireless device. UE may also refer to devices that have similar capabilities but that are not generally transportable, such as desktop computers, set-top boxes, or network nodes.

In traditional wireless telecommunications systems, transmission equipment in a base station or access device transmits signals throughout a geographical region known as a cell. As the technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" or "access device" will refer to any component, such as a traditional base station or an LTE or LTE-A base station (including eNBs), that can provide a UE with access to other components in a telecommunications system.

In mobile communication systems such as the E-UTRAN, a base station provides radio access to one or more UEs. The base station comprises a scheduler for dynamically scheduling downlink traffic data packet transmissions and allocating uplink traffic data packet transmission resources among all UEs communicating with the base station. The functions of the scheduler include, among others, dividing the available air interface capacity between UEs, deciding the transport channel for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

In LTE systems, within a communication channel, the base station transmits data to UEs using resource blocks or other encapsulated-data formats. Each resource block includes multiple resource elements (REs) arranged in a number of columns and a number of rows as known in the art (see, for example, FIGS. 1a and 1b). The position of each RE within the resource block corresponds to a particular time/frequency combination within the resource block. The frequency width of each RE can be referred to as a subcarrier or a frequency interval while the time duration of each RE can be referred to as a time interval. A piece of data being transmitted in each RE can be referred to as a data portion. The combination of data portions in each time interval can be referred to as an Orthogonal Frequency Division Multiplexed (OFDM) symbol. As such, a time interval can be referred to as an OFDM symbol interval.

During communication, the resource blocks may carry various reference signals to facilitate communication between a base station and a UE. The reference signals can be used for several purposes including distinguishing the several different communication modes that may be used to communicate with UEs, channel estimation, coherent demodulation, channel quality measurement, signal strength measurement, etc. Reference signals are generated using data known to both a base station and a UE, and can also be referred to as pilot, preamble, training signals, training symbols, training sequences, or sounding signals.

A UE uses the reference signals to estimate communication channel conditions between the UE and the base station. Because reference signals transmitted by a base station are initially transmitted using predetermined values, after receiving a reference signal transmission, the UE can compare those predetermined values to the reference signal values actually received from the base station. By analyzing how the reference signal values were modified or distorted by the communication channel, the UE can estimate the communication channel conditions between the UE and base station and, using that estimate, implement channel compensation to ensure transmissions from the base station are accurately received by the UE.

Exemplary reference signals for facilitating channel estimation include a cell-specific or common reference signal (CRS) that is sent by a base station to UEs within a cell and is used for channel estimation and channel quality measurement, a UE-specific or dedicated reference signal (DRS) sent by a base station to a specific UE within a cell that is used for demodulation of a downlink channel, a sounding reference signal (SRS) sent by a UE that is used by a base station for channel estimation and channel quality measurement, and a demodulation reference signal sent by a UE that is used by a base station for demodulation of an uplink transmission from the UE.

After performing channel estimation, the UE can demodulate data received from the base station. To ensure efficient data transmission, LTE downlink communications may adopt high-order spectrum efficient Quadrature Amplitude Modulation (QAM) schemes, i.e., QPSK, 16QAM, and 64QAM. The demodulation performance of high-order QAM schemes can be affected by the quality of the communication channel estimation. As such, a good channel estimation scheme for LTE downlink demodulation is important for optimal network performance.

LTE networks may specify a particular set of cell specific reference symbols, known as pilot symbols or pilots. The pilot symbols facilitate channel estimation and are scattered two-dimensionally (2D) throughout both the time-direction and the frequency-direction of a resource block. Because the pilot symbols are distributed in two-dimensions, pilot-symbol-aided channel estimation schemes and 2D channel estimation schemes are used in LTE network implementations.

FIGS. 1a and 1b are illustrations of subframes showing example time-frequency locations of cell specific reference symbols (i.e., pilots) for a first antenna within resource blocks in an LTE system. In other implementations, the pilot locations can be shifted by any number of subcarriers (e.g., 3) depending upon the system configuration. FIG. 1a shows pilot symbols distributed in subframes or resource blocks using a normal cyclic prefix, while FIG. 1b shows the pilot symbols distributed in subframes using an extended cyclic prefix. In each of FIGS. 1a and 1b, three subframes 100, 102 and 104 are illustrated. Each subframe is comprised of multiple REs represented by each individual square within each subframe. Each subframe includes 12 subcarriers or frequency intervals (the horizontal collection of REs running through each subframe in the time direction) transmitted over a total frequency band, with each subcarrier being transmitted at a single frequency over time. Each subcarrier corresponds to a single frequency interval.

In each subframe shown in FIGS. 1a and 1b, in the frequency direction (e.g., moving vertically within each subframe), the number of subcarriers excluding the direct current (DC) subcarrier depends on the channel bandwidth configuration but may generally be an integer multiple of 12. In the time direction, there are 14 OFDM symbol intervals or time intervals per subframe for the normal cyclic prefix configuration (see FIG. 1a) and 12 OFDM symbol intervals or time intervals per subframe for the extended cyclic prefix configuration (see FIG. 1b). Each OFDM symbol interval includes a vertical slice of REs of each subframe and includes REs at different frequencies (i.e., across different subcarriers). In LTE network implementations, each subframe is 1 ms wide and each RE is 15 kHz (or 7.5 kHz) wide in frequency and one OFDM symbol interval long in time.

Each subframe or resource block includes a number of pilot locations 106. In the examples shown in FIGS. 1a and 1b, the pilot location pattern includes 4 pilot locations 106 distributed within each of subframes 100, 102 and 104. The pilot location patterns repeat across both the time and frequency directions within a subframe and repeat within each subframe. When receiving downlink transmission from a base station, the UE uses the pilot symbols at pilot locations to perform channel estimation and, ultimately, demodulation of the downlink data transmissions.

When performing channel estimation, for an LTE UE, the received signal in the RE having subcarrier index k and OFDM symbol index s can be written as:

$$r(k,s) = H(k,s)x(k,s) + z(k,s) \quad (1)$$

In equation (1), H(k, s) is the frequency-domain channel state at the resource element (RE) location (k, s) in the subframe of interest, x(k, s) is the transmitted symbol, z(k, s) is the additive white Gaussian noise (AWGN) with zero mean and variance $\sigma^2$ and r(k, s) is the received signal. Generally, a UE performs data demodulation on a subframe by subframe or resource block by resource block basis over a number of subcarriers (e.g., in LTE the number may be an integer multiple of 12) that are allocated to the UE.

During data demodulation, the UE uses the transmitted downlink pilot symbols to perform downlink channel estimation to allow for coherent demodulation of signals transmitted from the base station. The original values of the transmitted pilots (or reference signals) x(k', s') with normalized energy are assumed to be known beforehand by both the base station and the UE, where k' and s' are respectively the subcarrier index and the OFDM symbol index for the received pilot symbols. The UE can then compare the received and known pilot symbols to generate the channel estimation at the pilot locations. The raw channel estimates at the pilot locations are given by equation (2).

$$\tilde{H}(k',s') = r(k',s')/x(k',s') = H(k',s') + n(k',s') \quad (2)$$

In equation (2), $\tilde{H}(k',s')$ denotes the raw channel estimate at subcarrier k' and OFDM symbol s', and n(k', s') is the background noise with zero mean and variance $\sigma^2$.

In the present disclosure, for notational simplicity, $S_{k'} = \{k'_1, k'_2, \ldots, k'_{N_K}\}$ denotes the pilot symbol subcarrier index set with $N_K$ indices (the set is the same at any given OFDM symbol with pilots) and $S_{s'}(t) = \{s'_{t-N_s+1}, s'_{t-N_s+2}, \ldots, s'_t\}$ denotes, at time instant t, the pilot symbol's OFDM symbol index set with $N_s$ indices for the recently received $N_s$ pilot OFDM symbols. The OFDM symbol index is enumerated from $s'_0$ at t=0 and it is presumed that the raw channel estimates at the pilot locations up to the OFDM symbol $s'_t$ are available. As such, the raw channel estimates of the pilot symbols in one or several previous subframes can be used. Also, it is presumed that no raw channel estimates at the non-pilot locations of the previous subframes are available.

Channel estimation techniques need to take into account the channel characteristics for a good performance. In a slow time-varying channel, the channel state realization over a particular time period may not change significantly. A channel estimation technique configured to use the extended time period (with minimal variation) and long-term averages when performing channel state estimation may result in inaccuracies due to short-term changes in the channel state condition causing inaccurate channel estimates. On the other hand, channel estimation techniques should not be too complex. A channel estimation technique with overly complex processing may cause substantial delay in the UE and excessive processor and battery power use.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
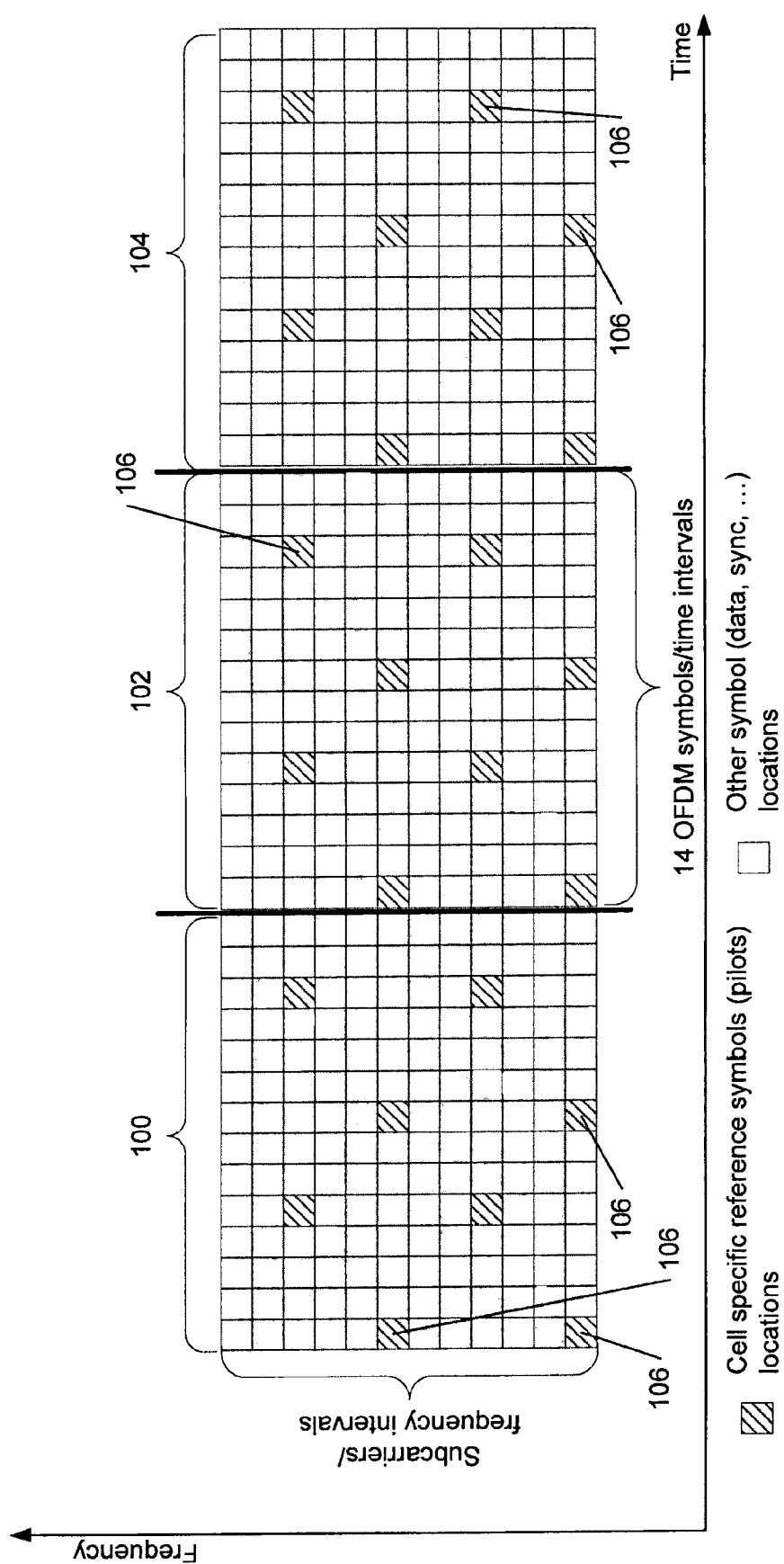
FIGS. 1a and 1b are illustrations of resource blocks showing example time-frequency locations of cell specific reference symbols (i.e., pilots) for a first antenna within resource blocks in an LTE system.
Figure 1B:
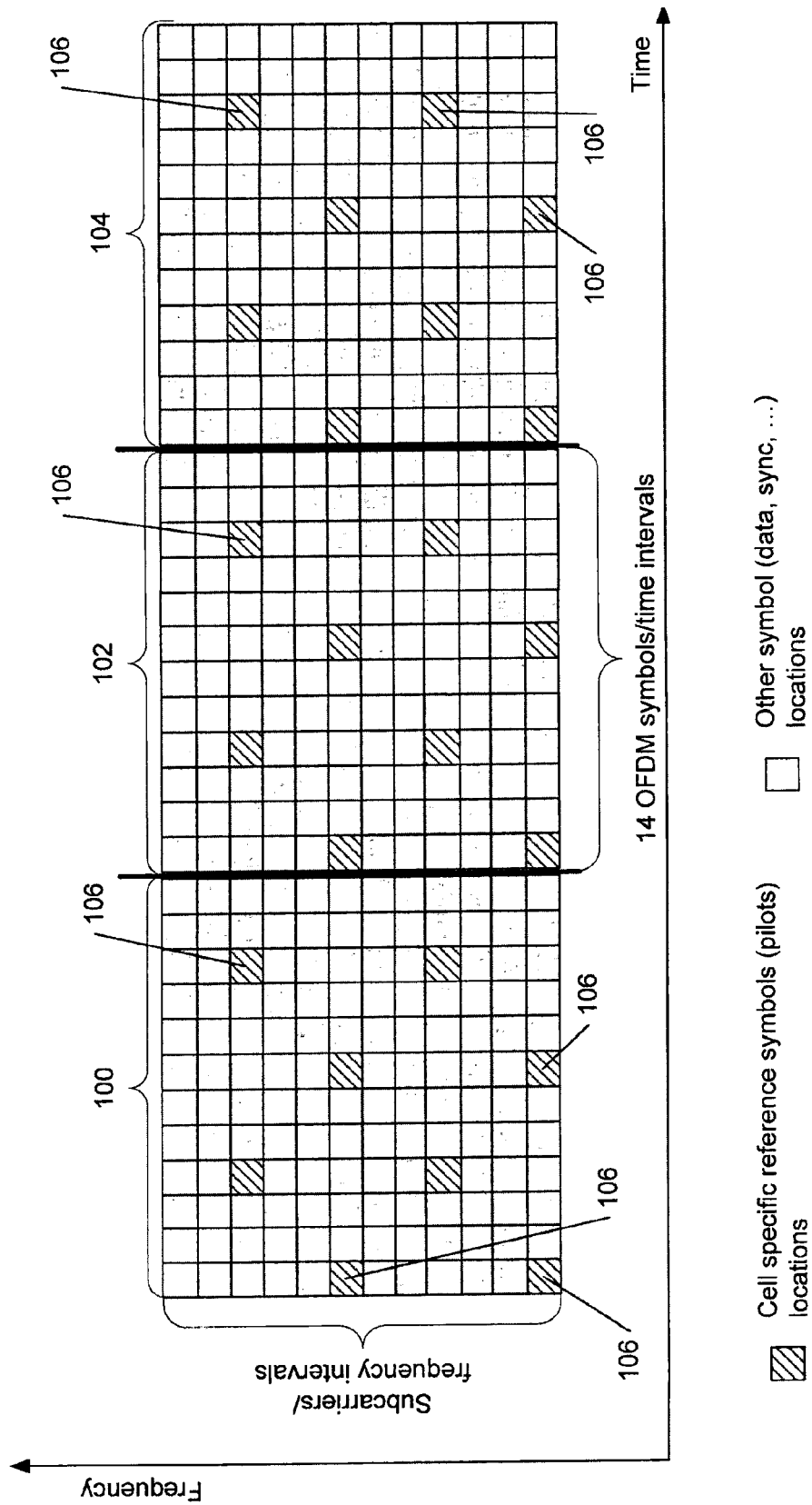

The present invention relates generally to data transmission in mobile communication systems and more specifically to channel estimation.

In some implementations, the present invention includes a method for channel estimation comprising receiving data at a number of frequency intervals in a frequency band over a number of first time intervals. Each frequency interval and each first time interval comprise a portion of the data, and a number of the data portions comprise pilot symbols. The method includes determining a first set of channel estimates for each pilot symbol within the data over a second time interval comprising at least one first time interval, and performing one of time-direction interpolation and frequency-direction interpolation to determine a second set of channel estimates for a number of data portions in a frequency interval using the first set of channel estimates. The frequency interval comprises a data portion comprising a pilot symbol. The method includes performing the other of time-direction interpolation and frequency-direction interpolation to determine a third set of channel estimates for each first time interval using at least one of (a) the first set of channel estimates and (b) the second set of channel estimates.

In other implementations, the invention is a user equipment for channel estimation, comprising a processor configured to receive data at a number of frequency intervals in a frequency band over a number of first time intervals. Each frequency interval and each first time interval comprise a portion of the data, and a number of the data portions comprise pilot symbols. The processor is configured to determine a first set of channel estimates for each pilot symbol within the data over a second time interval comprising at least one first time interval. The processor is configured to perform one of time-direction interpolation and frequency-direction interpolation to determine a second set of channel estimates for a number of data portions in a frequency interval using the first set of channel estimates. The frequency interval comprises a data portion comprising a pilot symbol. The processor is configured to perform the other of time-direction interpolation and frequency-direction interpolation to determine a third set of channel estimates for each first time interval using at least one of (a) the first set of channel estimates and (b) the second set of channel estimates.

In other implementations, the invention is a network component for channel estimation comprising a processor configured to receive data at a number of frequency intervals in a frequency band over a number of first time intervals. Each frequency interval and each first time interval comprise a portion of the data, and a number of the data portions comprise pilot symbols. The processor is configured to determine a first set of channel estimates for each pilot symbol within the data over a second time interval comprising at least one first time interval, and perform one of time-direction interpolation and frequency-direction interpolation to determine a second set of channel estimates for a number of data portions in a frequency interval using the first set of channel estimates. The frequency interval comprises a data portion comprising a pilot symbol. The processor is configured to perform the other of time-direction interpolation and frequency-direction interpolation to determine a third set of channel estimates for each first time interval using at least one of (a) the first set of channel estimates and (b) the second set of channel estimates.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The present system provides a channel estimation scheme. The scheme assumes no statistical channel knowledge, and adopts a short-term average to refine raw channel estimates at pilot locations. The scheme also uses time-direction and frequency-direction interpolation performed sequentially to estimate channel states at non-pilot locations. The present system may operate upon communication channels used to transmit resource blocks. In some communication networks, however, rather than using resource blocks, data may be encapsulated in other structures having time and frequency-direction components. The present system can be used to perform channel estimation using any appropriate data encapsulation scheme. When performing interpolation, a finger tracking scheme may be used to improve the interpolation performance.

Figure 2:
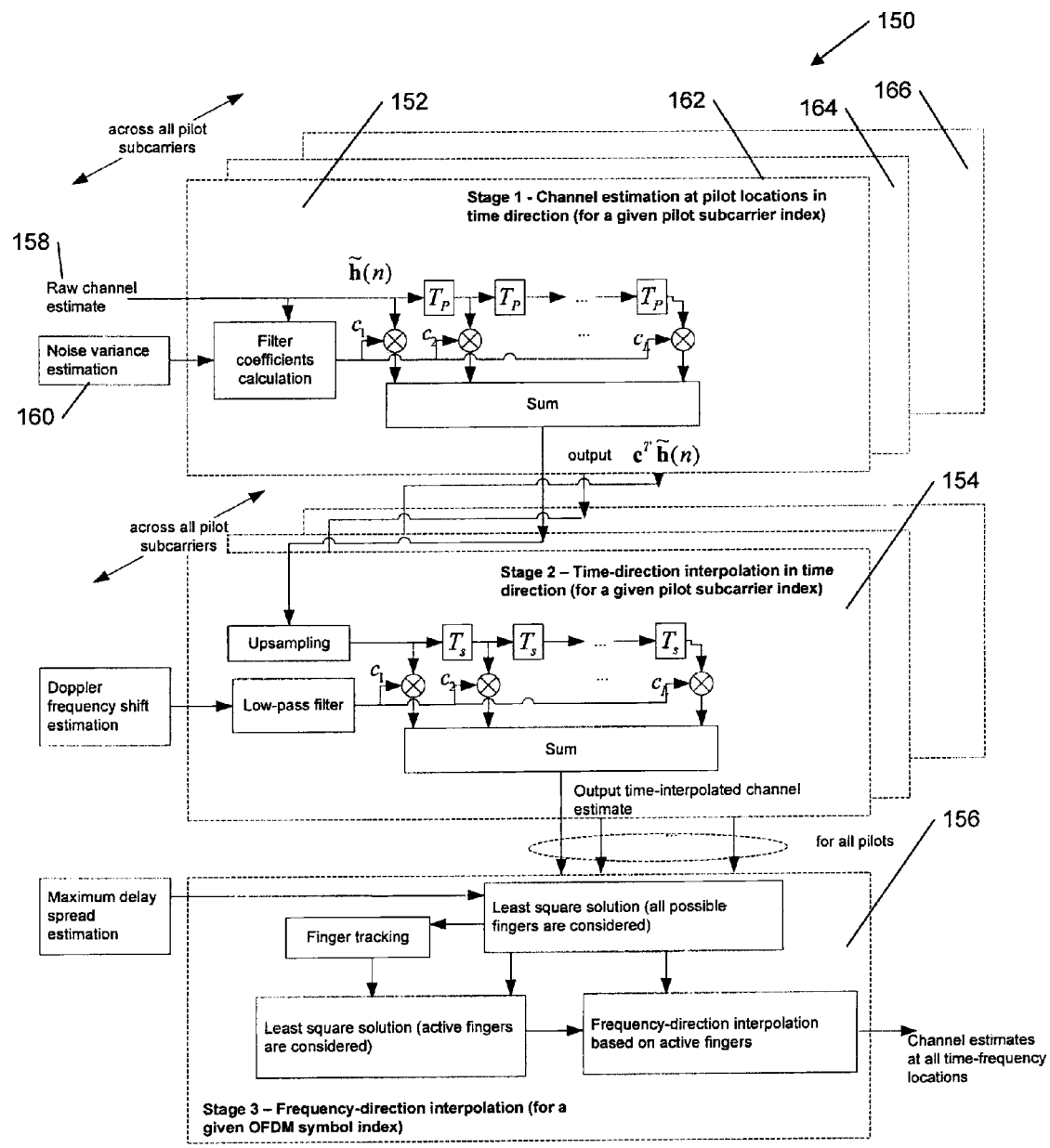
FIG. 2 is an illustration of the data flow in the present three-stage channel estimation scheme.

FIG. 2 is an illustration of the data flow in the present three-stage channel estimation scheme. Three-stage channel estimation scheme 150 includes three stages, 152, 154, and 156. The first two stages, 152 and 154, can be implemented across all pilot subcarriers within a communication channel and may be combined into a single stage. The last stage, stage 156, can be implemented across all subcarriers.

Stage 152 includes a raw channel estimate refinement that generates a channel estimation using pilot symbols at the pilot locations. Generally, stage 152 receives as input raw channel estimate 158 and noise variance estimation 160 and uses a filtering approach to refine channel estimates at the pilot locations contained within a subframe. Although the channel estimation is performed at the pilot locations, in one implementation of stage 152 the channel estimates are generated using data from multiple time intervals. In that case, the multiple time intervals (e.g., a second set of time intervals) include at least one time interval that contains the pilot symbol for which the channel estimate is prepared.

As shown in FIG. 2, there are a set of independent channel estimators 162, 164, and 166 equal to the number of different subcarriers or frequency intervals containing pilot symbols (in FIG. 2, three estimators are shown, but the number may be modified depending upon the number of subcarriers containing pilots).

For a given pilot subcarrier index, the refined channel estimate for a particular pilot OFDM symbol or at a time interval is a filtered output of the input raw channel estimates at neighboring OFDM symbol intervals. In FIG. 2, $T_P$ is the time-interval between the pilots in the time-direction.

Within stage 152, the filter coefficients may be selected to minimize a sliding window such as a generalized sliding window (e.g., a short-term average—see, for example, K. Maouche and D. T. M. Slock, "Performance analysis and FTF version of the generalized sliding window recursive least-squares algorithm", IEEE 29th Asilomar Conf. Signals, Systems, and Computers, vol. 1, pp. 685-689, 1995) based least-squares (LS) error between the channel state and refined channel estimates. The short-term average based filter coefficients might provide improved tracking of the channel state in time-varying channels.

In an alternative implementation, the filter coefficients may be selected using a low-pass filter with a cut-off frequency set to $f_{D_{max}}/(f_{sampPilot}/2)$, where $f_{D_{max}}$ is the maximum Doppler frequency shift estimate and $f_{sampPilot}$ is the sampling rate of the pilots. Generally, for LTE antennas 1 and 2, $f_{sampPilot}$ is 2 kHz as there are two pilots per 1 millisecond (ms) for the same subcarrier. If $f_{D_{max}}$ is small, a low-pass filter with $N_f$ taps will be an average of $N_f$ recent raw channel estimates (of the same subcarrier). Such an implementation may reduce the noise associated with the raw channel estimates and improve the estimation performance.

The second stage, stage 154, implements time-direction interpolation within subcarriers or frequency intervals (i.e., horizontal rows of REs) that contain pilot symbols. Stage 154 may use a low-pass filter for time-direction interpolation along a particular frequency interval of the subframe. Upon receiving the refined channel estimates at the pilot locations from processing stage 152, stage 154 performs up-sampling by inserting zeros for channel estimates at non-pilot locations and passing the zero-inserted channel estimates through a time-direction interpolation filter. Note that in FIG. 2, the coefficients c1, c2, . . . cL shown in stage 154 and not the same as the coefficients c1, c2, . . . cL shown for stage 152, each stage generates a different set of coefficients. The time-direction interpolation filter may include a low-pass filter with the cut-off frequency set to $f_{D_{max}}/(f_{sym}/2)$, for example, where $f_{sym}$ is the sampling frequency corresponding to the occurrence of OFDM symbols for which the channel estimates are to be interpolated. In accordance with the sampling theorem, low-pass filtering can work well provided that the maximum Doppler frequency shift does not exceed half of the sampling rate of the pilots. In one particular implementation, for LTE antennas 1 or 2, the sampling rate of the pilots is 2 kHz (two pilots per 1 ms for the same subcarrier).

To avoid calculating the low-pass filter coefficients for each possible $f_{D_{max}}$, stage 154 may be configured to use pre-calculated sets of filter coefficients for several typical cases such as low, medium, and high Doppler frequency shifts. Based upon the Doppler frequency shift estimate for a particular resource block, sequence of resource blocks, or other received data, the UE can then select the set of pre-calculated filter coefficients with a cut-off frequency above and closest to the Doppler frequency shift estimate normalized by $f_{sym}/2$.

The third stage, stage 156, of the present channel estimation scheme implements frequency-direction interpolation using the channel estimates generated by stage 154 for the time intervals of the subframe. After performing time-direction interpolation to identify channel estimates for the data portions at REs extending horizontally away from the pilot locations (see, for example, FIG. 4, described below), the third stage of the present scheme interpolates in the frequency direction by performing channel estimation for the data portions at REs extending above and below those REs at which channel estimates have already been determined.

Accordingly, using the time-direction channel estimates generated in stage 154, stage 156 interpolates the remaining channel estimates in the frequency-direction throughout each OFDM symbol interval and for each frequency interval. In one implementation, the frequency-direction interpolation generally involves frequency-domain to time-domain conversion and then back to frequency-domain conversion. Stage 156 may be configured to presume that the reciprocal of the frequency spacing between two available neighboring channel estimates at the same OFDM symbol interval is less than the maximum delay spread of the channel, often the case in LTE.

In stage 156, a finger tracking scheme may also be used to further refine the channel estimates. A finger refers to a time-domain fading channel path received with sufficient energy for estimation processing. The present finger tracking scheme again uses the sliding window-based LS solution to obtain the initial finger information. The scheme then establishes tracking criteria based upon the finger energy to determine whether to delete a fading finger or to add a new finger, for example.

In one implementation, the finger tracking scheme provides a parametric non-linear time-filtered version of the channel impulse response that is used to extract potential delay path locations (i.e., fingers), based on the power of a path exceeding a particular threshold.

The finger tracking scheme may be implemented by first estimating all possible fingers corresponding to all channel impulse response (CIR) delays using a large matrix LS solution. The active fingers (i.e., the fingers being tracked) are then estimated using a small matrix LS solution. Second, the power of each CIR delay (i.e., a potential finger) can be filtered in time using an infinite impulse response (IIR) filter. For active fingers (fingers being tracked), the small matrix LS solution can be used, while for inactive fingers (fingers not being tracked), the large matrix LS solution can be used.

The fingers are then updated at each new time step. For each finger, either active or inactive, if the power of an active finger falls below a threshold level (e.g., $T_{drop}$) for a number of consecutive time steps ($N_{drop}$), that finger may be dropped and be designated as inactive. If, however, the power level of an inactive finger remains above a threshold level ($T_{add}$) for a number of consecutive time steps ($N_{add}$), that finger may be added and become active. The set of active finger locations and their corresponding amplitude levels can then be used to generate the frequency-direction channel estimates.

As discussed above, the channel estimation scheme illustrated in FIG. 2 provides for a short-term average, raw channel estimate refinement, and most significant tap (finger) exploration in time-varying channels.

In the present disclosure, a general form of the frequency-domain filtering based channel estimation constructs H(k, s) from the available raw channel estimates $\tilde{H}(k', s')$ for $k'=k'_1, k'_2, \ldots, k'_{N_k}$ and $s'=s'_{t-N_s+1}, s'_{t-N_s+2}, \ldots, s'_t$, as shown in equation (3):

$$\hat{H}(k, s) = \sum_{k'=k'_1}^{k'_{N_K}} \sum_{s'=s'_{t-N_S+1}}^{s'_t} c(k, s; k', s') \tilde{H}(k', s') \quad (3)$$

In equation (3), $\hat{H}(k, s)$ is the channel estimate at location (k, s) and c(k, s; k',s') is the filter coefficient used to weight the raw estimate of $\tilde{H}(k', s')$. Given the construction shown in equation (3), channel estimation requires finding an optimum set of constants {c(k, s; k', s')}.

The present system provides a three-stage channel estimation scheme. The system can be used to filter raw channel estimates for a time-frequency location or particular time or frequency interval of interest and may be implemented by a UE, for example, any other network component, or any other network device configured to receive signals via a communications network. Alternatively, the present channel estimation scheme may, in some cases, be implemented by a base station. The present system can be used to provide improved channel estimates in a time-variant channel. This is contrast to some existing estimation techniques that are only optimized for time-invariant channels and that cannot, therefore, compensate effectively for short-term anomalies found in a slowly time-varying channel.

Pilot Location Estimates

In the first stage of the present channel estimation scheme, channel estimation is performed at the pilot locations (for the time/frequency data portions containing a pilot symbol) within a subframe. A short-term average is used rather than a long-term average. The short term average may determine the pilot-location channel estimation using a sliding window or a set of time intervals (the set of time intervals may be defined as a time period that is long enough to include multiple time intervals or REs) that includes multiple REs at which data portions contain pilot symbols. Accordingly, to perform pilot-location estimation, the present system uses a collection of time intervals of the resource block or other data encapsulation, wherein each collection of time intervals includes at least one time interval that contains a pilot symbol.

When using the short-term average, to compensate for sudden signal parameter changes, a sliding window is used as it can provide faster tracking. The sliding window is configured to include a series of time slots or time intervals, or a time period that encompasses multiple time intervals within a resource block or other data structure that contains data portions over which preceding data is analyzed. In describing the first stage of the channel estimation scheme, a generalized sliding window (GSW) (see, for example, K. Maouche and D. T. M. Slock, "Performance analysis and FTF version of the generalized sliding window recursive least-squares algorithm", IEEE 29th Asilomar Conf. Signals, Systems, and Computers, vol. 1, pp. 685-689, 1995) is used and the cost function is in the following least-squares (LS) form shown in equation (4).

$$J(\hat{c}_{k,s}(t)) = \sum_{n=t-T_0+1}^{t} w_0^{t-n} |H(k, s_n) - \hat{c}_{k,s}^T(t)\tilde{h}_k(n)|^2 \quad (4)$$

In equation (4), $\hat{c}_{k,s}(t)$ (is a vector of filter coefficients at time instant t for a given pilot subcarrier k=k' (k is used to represent the subcarrier of interest by removing the superscript from k') and $\tilde{h}_k(n)=[\tilde{H}(k,s'_{n-N_s+1}), \tilde{H}(k,s'_{n-N_s+2}), \ldots, \tilde{H}(k,s'_n)]^T$ is a column vector of the raw channel estimates at pilot locations corresponding to subcarrier index k and at time instant n, where the latest raw channel estimate is up-shifted to $\tilde{h}_k(n)$. Here, $w_0$ is the forgetting factor and $T_0$ is the time interval of the observation window. If, for example, $w_0$ is set to 1, the generalized window in equation (4) becomes a sliding window for determining a short-term average.

The LS solution to equation (4) is given by equation (5).

$$\hat{c}_{k,s}(t)[\tilde{R}_k(t)]^{-1}\tilde{d}_{k,s}(t) \quad (5)$$

With reference to equation (5), the following two definitions are made:

$$\tilde{R}_k(t) = \sum_{n=t-T_0+1}^{t} w_0^{t-n}\tilde{h}_k^*(n)\tilde{h}_k^T(n) \quad (5a)$$
$$= w_0\tilde{R}_k(t-1) + \tilde{h}_k^*(t)\tilde{h}_k^T(t) - w_0^{T_0}\tilde{h}_k^*(t-T_0)\tilde{h}_k^T(t-T_0)$$

$$\tilde{d}_{k,s}(t) = \sum_{n=t-T_0+1}^{t} w_0^{t-n}\tilde{h}_k^*(n)H(k, s_n) \quad (5b)$$
$$= w_0\tilde{d}_{k,s}(t-1) + \tilde{h}_k^*(t)H(k, s_n) - w_0^{T_0}\tilde{h}_k^*(t-T_0)H(k, s_n)$$

In equations (5a) and (5b), $\tilde{R}_k(t)$ and $\tilde{d}_{k,s}(t)$ denote, respectively, the correlation matrix and the cross-correlation vector at time instant t and the superscript "*" denotes the conjugate.

From equations (5a) and (5b), although $\tilde{R}_k(t)$ can be computed directly, $\tilde{d}_{k,s}(t)$ cannot because $H(k,s_n)$ is unknown if $s_n$ is not a pilot OFDM symbol index or an index of time intervals at which data portions contain pilot symbols. Even though the statistical channel knowledge may be known, that knowledge includes only a long-term average and is not suitable for use as short-term channel statistics.

Accordingly, the UE may compute cross-correlation vectors $\tilde{d}_{k,s}(t)$ for OFDM symbols or time intervals that contain pilot symbols and then interpolate the cross-correlation vectors at the non-pilot locations. If linear interpolation is used, the interpolation on $\tilde{d}_{k,s}(t)$ may be equivalent to the interpolation on $\hat{c}_{k,s}(t)$ and, accordingly, equivalent to the interpolation of $\hat{c}_{k,s}^T(t)\tilde{h}_k(n)$. As such, a filter coefficient vector update for the pilot locations may be sufficient. That filter coefficient vector can then be used to refine the channel estimates at the pilot locations, which in turn can be used to interpolate the channel estimates at the non-pilot locations, as described below.

Accordingly, in summary, in the first stage of the present channel estimate scheme, channel estimation at pilot locations $(k,s'_{n-M+1})$, where M denotes the M-th symbol back in the time-direction from the current pilot symbol index $s'_n$ of interest, may be performed using the following steps:

First, the system evaluates the auto-correlation matrix $\tilde{R}_k(t)$, for example, using equation (5a).

Second, the system evaluates the cross-correlation vector $\tilde{d}_k(t)$ as expressed in equation (5b) but for the channel state $H(k,s'_{n-M+1})$. Because $H(k,s'_{n-M+1})$ is unknown, the system may use $\hat{H}(k,s'_{n-M+1})$ instead and subtract the noise contribution. Accordingly, $\tilde{d}_k(t)$ can be approximated by the M-th column vector (counted backwards in the time direction—for example, the corresponding column vectors for M=1 and 2 are, respectively, the last and second last column vectors in the matrix) from the matrix $\tilde{R}_k(t)-\hat{\sigma}^2 I$, where $\hat{\sigma}^2$ is the noise variance estimate and I is the identity matrix. Here, the subscript s is removed from $\tilde{d}_{k,s}(t)$ as the cross-correlation vector is updated once when a new raw channel estimate at the pilot location is received, the pilot location has been indicated by the time index t, and therefore the extra symbol index s can be removed. Also, the noise variance estimation can be performed using frequency-domain samples at the guard band or by other means.

Third, the system computes the filter coefficient vector $\hat{c}_k(t)$ using the auto-correlation matrix and the cross-correlation vector. As in equation (5), $\hat{c}_k(t)=[\tilde{R}_k(t)]^{-1}\tilde{d}_k(t)$. Again, the filter coefficient vector is for the pilot location only, which has been indicated by the time index t. As such, the symbol index s can be omitted.

Fourth, the system computes the refined channel estimate at pilot location $(k,s'_{n-M+1})$ as $\hat{H}(k,s'_{n-M+1})=\hat{c}_k^T(t)\tilde{h}_k(n)$ using the filter coefficient vector.

In the present system, parameter selection may require a trade-off between complexity and performance. Although various parameters may be used, in one implementation, the following parameter values are used to provide the appropriate short-term average sliding window. For the sliding window, $w_0$ can be set to 0.999 and $T_0$ can be set to 20. The number of pilot OFDM symbols for estimation ($N_s$) can be set to 20. We let M denote which pilot OFDM symbol to estimate at time instant t, i.e., s't−M+1, where M may be set to 3.

In alternative implementations of the present system, adaptive recursive least squares (RLS) or the Kalman algorithm (see J. G. Proakis, Digital Communications, 4th edition, McGraw Hill, New York, 2000) can be used to estimate the filter coefficients at the pilot symbol locations. Using the cost function defined in equation (4), therefore, a generalized RLS can be implemented.

After performing the preliminary channel estimation at the pilot symbol locations of the resource block in the first stage of the present system, the preliminary channel estimates are interpolated at the non-pilot locations of the resource block in the time direction for each pilot frequency interval, i.e., the frequency interval that contains at least one pilot location.

Time-Direction Interpolation

In the second stage of the present channel estimation scheme, the UE interpolates the time-direction channel estimates using the pilot location channel estimates generated in the first stage. In other words, the system performs channel estimation in a horizontal direction (i.e., along each pilot frequency interval) across all resource elements of the subframes that contain pilot symbols.

Given a time-varying channel, the power spectrum of the channel impulse response is band-limited to the maximum Doppler frequency shift. As such the interpolation in the time-direction may be a low-pass filter. In the present implementation, the low-pass filter is configured with a cutoff frequency dependent upon the maximum Doppler frequency shift and the corresponding sampling frequency of the interpolated channel estimates.

Figure 3:
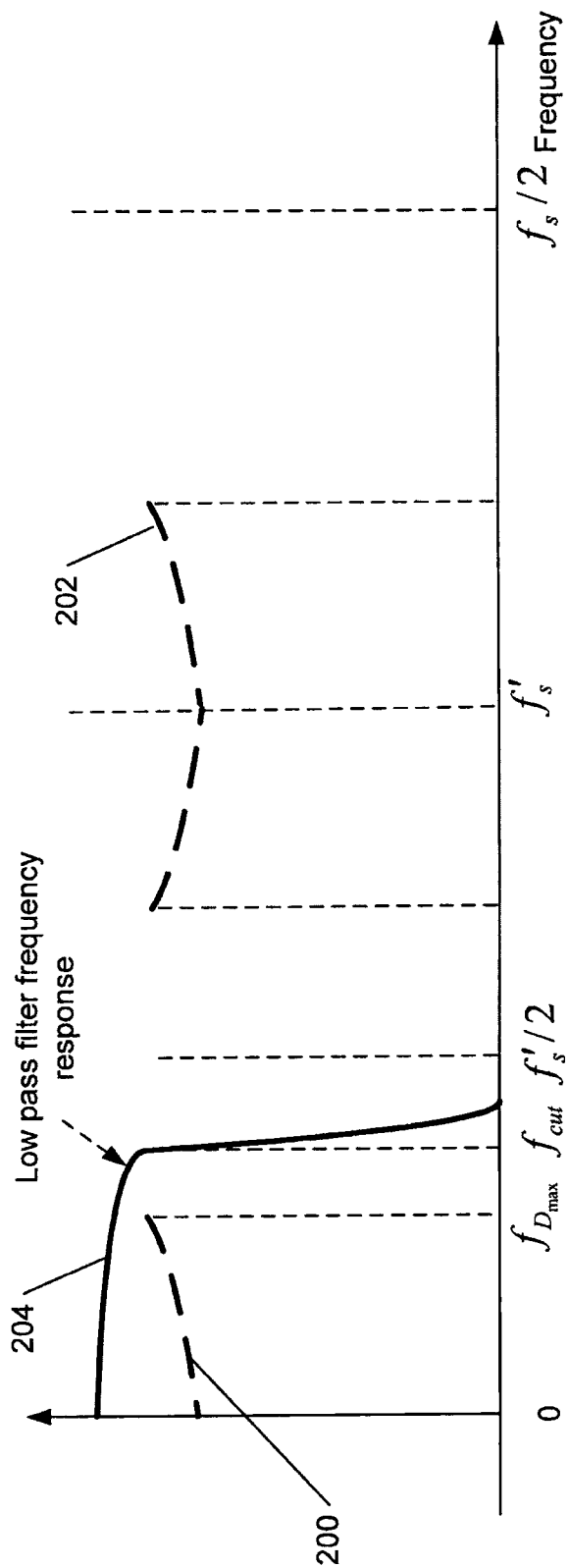
FIG. 3 is an illustration of an exemplary low-pass filter for performing channel estimate interpolation in the time direction using the second stage of one implementation of the present channel estimation scheme.

FIG. 3 is an illustration of an exemplary low-pass filter for performing channel estimate interpolation in the time direction according to the second stage of the present system. Referring to FIG. 3, the typical power spectrum of a time-varying channel (single side band) is shown as element 200 with images 202 (one image is shown) of the power spectrum being generated as a result of up-sampling. Generally, the power spectrum of the time-varying channel 200 extends to the maximum Doppler frequency shift $f_{D_{max}}$. As shown in FIG. 3, low-pass filter 204 for implementing time-direction interpolation includes a corner at $f_{cut}$ (a value greater than $f_{D_{max}}$), and attenuates signals having a frequency greater than the half of the pilot sampling frequency ($f_s/2$). Accordingly, low-pass filter 204 will reject the spectrum images 202 caused by the up-sampling.

For optimum performance, the pilot sampling rate should be larger than twice the maximum Doppler frequency shift $f_{D_{max}}$.

When using the filter shown in FIG. 3, in one particular implementation of the present system the parameter selection for the filter is as follows. The maximum Doppler frequency shift for a particular resource block transmission or sequence of transmissions ($f_{D_{max}}$) may be set to $v/cf_c$, with v=UE speed in meters per second (m/s), c=speed of the light in meters per second, and $f_c$=carrier frequency in Hz. The cutoff frequency of the filter may be set as follows. If $f_{D_{max}}$ is known, $f_{cut}$ may be set equal to $f_{D_{max}}$. In other implementations, however, $f_{cut}$ may be increased (e.g., by approximately 20% to approximately 120% of $f_{D_{max}}$) to provide a margin. Alternatively, $f_{cut}$ may be set to the maximum possible Doppler frequency shift (determined by the maximum possible UE speed and the carrier frequency).

The sampling frequency for pilots ($f'_s$) can be set as follows. In LTE, for each of Antennas 1 and 2, $f'_s$ may be set to 2 kHz if there are two pilots per 1 ms for the same subcarrier. For each of Antennas 3 and 4, $f'_s$ can be set to 1 kHz as there is one pilot per 1 ms for the same subcarrier. The maximum possible Doppler frequency shift that can be handled may be limited to 500 Hz, for example.

The sampling frequency for the interpolated samples ($f_s$) may be set equal to the number of OFDM symbol intervals divided by 1 ms. Accordingly, $f_s$ is set to 14 kHz for LTE systems with normal cyclic prefix and 12 kHz for LTE systems with extended cyclic prefix.

Using the described low-pass filter, the present time-direction channel interpolation may be implemented as follows.

First, after receiving channel estimates at the pilot locations (generated by the first stage, described above), in the second stage of the present channel estimation scheme, zeros are inserted for the channel estimates at the non-pilot locations and the resulting dataset is passed through a time-direction interpolation filter along a frequency interval that contains at least one pilot location.

In one implementation, the time-direction interpolation filter is designed as an ideal low-pass filter based upon the maximum Doppler frequency shift in the communication channel (see, for example, FIG. 3). The maximum Doppler frequency shift can then be estimated by evaluating the cross-correlation of the channel estimates at the pilot locations and estimating the channel coherence time or by other means.

To reduce implementation complexity, several sets of filter coefficients may be pre-calculated for various typical cases, such as low, medium, and high Doppler frequency shift, respectively. For example, low Doppler frequency shift may be defined as frequencies less than 30 Hz, medium Doppler frequency shift may be defined as frequencies between 30 Hz and 100 Hz, and high Doppler frequency shift may be defined as frequencies greater than 100 Hz. Then, based upon the detected or pre-determined Doppler frequency shift estimate, the system can select an appropriate set of filter coefficients having cut-off frequencies just above the Doppler frequency shift estimate (normalized by $f_s/2$). As such, in the present system, the Doppler frequency shift estimate may not need to be particularly accurate.

In some cases, given a pilot symbol n, it is necessary to interpolate the samples from the pilot symbol n−M+1 to the recently received pilot symbol n. As such, it may be necessary to consider a fast decay of the impulse response of the interpolation filter when designing the present filter.

For one example implementation, the following may be a parameter selection for the low-pass filter. Again, the parameter selection is a trade-off between complexity and performance. The number of sets of filter coefficients is set to 3 (for low, medium, and high Doppler frequency shift). The number of filter coefficients is set to approximately 40, 30, and 20 for low, medium, and high Doppler frequency shift, respectively; as the cut-off frequency decreases, that may require an increase in the number of filter coefficients.

Figure 4:
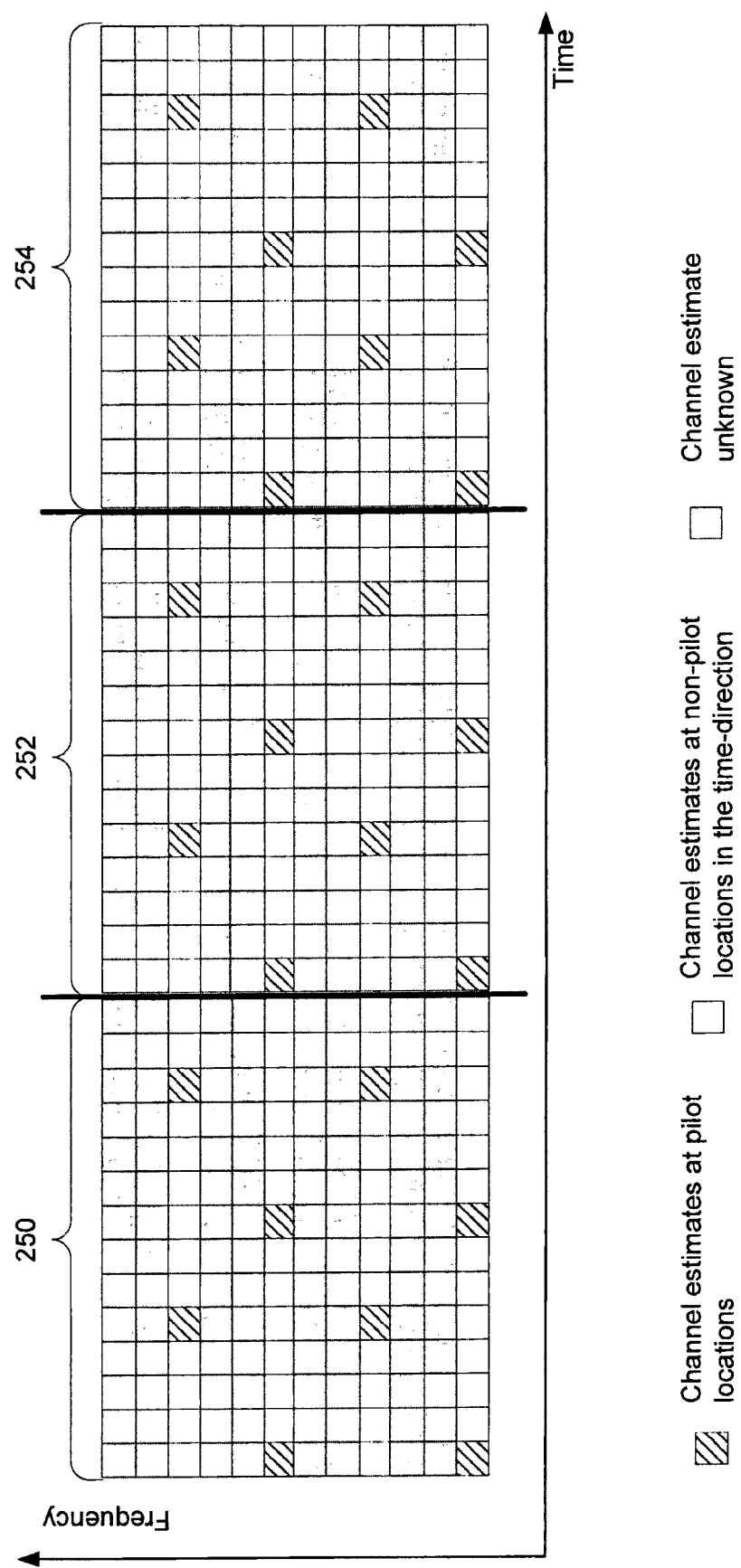
FIG. 4 is an illustration of the resource elements within a series of subframes or resource blocks for which channel estimates have been determined after the first and second processing stages of one implementation of the present channel estimation scheme.

After performing the second stage time-direction channel estimation, the system has determined channel estimates for the REs at which data portions contain pilot symbols as well as the REs at which at least one of data portions along the frequency intervals contains the pilot symbols. FIG. 4 is an illustration of the REs or location of the data portions within a series of subframes or resource blocks (including subframes 250, 252, and 254) for which channel estimates have been determined after the first and second processing stages of the present system (i.e., after performing pilot symbol location channel estimation, and time-direction interpolation).

As shown in FIG. 4, channel estimates have been prepared for each RE occupying a row (e.g., a subcarrier or frequency interval) that contains a pilot symbol. In the third stage of the present channel estimation scheme, frequency interpolation is implemented to determine channel estimates for the remaining data portions for which a channel estimate has not been prepared. Note that FIG. 4 shows the subframes as implemented for the normal cyclic prefix.

Frequency-Direction Interpolation

To implement the third-stage frequency-direction channel estimation, for any given OFDM symbol interval or time interval, the present system uses frequency-direction interpolation to convert the frequency-domain channel estimates to the time-domain, pad zeros, and then convert back to the frequency-domain. This approach may be optimal when the maximum delay spread of the channel impulse response does not exceed the reciprocal of the pilot spacing in the frequency-domain.

In the present system, as illustrated in FIG. 4, in an LTE implementation the spacing between pilot symbols in the frequency direction is three subcarriers (or frequency intervals), or 45 kHz. The corresponding time-domain impulse response interval is, therefore, 22.22 microseconds (ps), which is more than the cyclic prefix (CP) duration of approximately 5 µs in LTE with normal CP or the CP duration of approximately 17 µs in LTE with extended CP. In some cases, it is possible that the maximum delay spread is longer than the CP duration but, in that case, the associated path energy would be small and can be ignored.

Because the LTE downlink inserts a DC subcarrier between two neighboring sets of pilots around the DC subcarrier and the pilots do not cover the entire channel bandwidth, a direct inverse fast-Fourier transform (IFFT) may not be optimal to obtain the time-domain impulse response. A down-sampled least-squares solution (see, for example, A. Ancora, C. Bona, and D. T. M. Slock, "Down-sampled impulse response least-squares channel estimation for LTE OFDMA", IEEE Int. Conf. Acoustics, Speech, and Signal Processing, April 2007) can be used to track all possible fingers within the maximum delay spread. To reduce the number of fingers to be tracked, the present channel estimation scheme can use the following finger tracking scheme to perform frequency-direction channel interpolation.

In the present system, an equivalent multipath (or multi-finger) fading channel model can be written as follows (note, for an example derivation of equation (6) see equation 14.5-8 of J. G. Proakis, Digital Communications, 4th edition, McGraw-Hill, New York, 2000).

$$\alpha(\tau; t) = \sum_{p=0}^{P-1} \alpha_p(t)\delta(\tau - \tau_p T'_s) \quad (6)$$

In equation (6), P is the number of fading paths, $\alpha_p(t)$ is the fading coefficient at time instant t for path p with delay $\tau_p T'_s$, $\delta(.)$ is the Dirac delta function, and $\tau_p$ is an integer. $T'_s$ is a time interval (e.g., a finger time spacing) used in the finger tracking and it could be set larger than or equal to the nominal sampling interval used in the FFT, i.e., $T_s=1/(N \times 15000)$ seconds for a given FFT size N. $T'_s$ provides a finger delay or tap spacing and in one implementation may be set to a value less than or equal to the reciprocal of the bandwidth (W) occupied by a real band-pass signal (i.e., LTE signal). In one implementation, the nominal sampling interval may be considered to be the reciprocal of the multiplication of the FFT size and the subcarrier spacing.

Given the channel estimates along the pilot symbol-containing subcarriers from processing stages 1 and 2 described above, the estimate of the channel impulse response minimizes the sliding window based LS cost function shown in equation (7).

$$J(\hat{\alpha}(\tau; t)) = \sum_{s=t-T_1+1}^{t} w_1^{t-s} \sum_{k'} \left| \hat{H}(k', s) - \sum_{p=0}^{P-1} \alpha_p(t) e^{-j2\pi\tau_p(T'_s/T_s)k'/N} \right|^2$$

$$= \sum_{s=t-T_1+1}^{t} w_1^{t-s} \sum_{k'} |\hat{H}(k', s) - \hat{\underline{\alpha}}^T(t)\underline{F}_{k'}(t)|^2 \quad (7)$$

In equation (7), $w_1$ is the forgetting factor, $T_1$ is the time interval of the observation window, $\Sigma_{k'}$ is for all pilots of the same OFDM symbol index s, $T'_s/T_s$ is an interval conversion factor to convert the finger tracking time interval in (6) to the FFT related nominal sampling interval $T_s$ should those two values be different, and $\hat{H}(k', s)$ is the available channel estimate at location (k',s) for the pilot subcarrier index (see FIG. 4). Also, in equation (7) the following definitions are established:

$$\hat{\underline{\alpha}}(t)[\hat{\alpha}_0(t), \hat{\alpha}_1(t), \ldots, \hat{\alpha}_{P-1}(t)]^T \quad (8)$$

$$\underline{F}_{k'}(t) = [e^{-j2\pi\tau_0(T'_s/T_s)k'/N}, e^{-j2\pi\tau_1(T'_s/T_s)k'/N}, \ldots, e^{-j2\pi\tau_{P-1}(T'_s/T_s)k'/N}]^T \quad (8b)$$

In equations (8) and (8b), $\hat{\underline{\alpha}}(t)$ is a vector of fading coefficients, also known as fingers, and $F_{k'}(t)$ is a vector of exponential forms corresponding to the finger delays and subcarrier k', respectively.

In this implementation, equation (7) is a general cost function. Setting $T_1$ equal to 1 results in an estimation of the channel impulse response based on the channel estimate at the current symbol. However, by making use of several previous symbols, the present system can provide improved interpolation performance.

After the fingers and their associated delays are available, the frequency domain channel interpolation for all subcarrier k of interest is given by the following equation (9).

$$\hat{H}(k,s) = \sum_{p=0}^{P-1} \hat{\alpha}_p(t) e^{-j2\pi \tau_p (T'_s/T_s) k/N} \qquad (9)$$

In the present system, the following finger scheme can be used to estimate the fingers and their associated delays. This finger scheme can be used when tracking all fingers. The scheme's computational complexity is relatively low because the inverse of $R_{all}$ can be pre-calculated. In this implementation the system may assume all possible finger delays from 0 to the maximum delay spread, i.e., $$\tau_p = p \text{ for } p = 0, 1, \ldots, P_{max}-1 \qquad (10)$$

In equation (10), $P_{max}$ is selected to be equal to $\lceil D_{max}/T'_s \rceil$ and $D_{max}$ is the maximum delay spread estimate. When all fingers from 0 to $P_{max}-1$ with $\tau_p = pT'_s$ are active, the LS solution of equation (7) is given by:

$$\hat{\alpha}_{all}(t) = R_{all}^{-1} D_{all}(t) \qquad (11)$$

$$R_{all} = \sum_{s=t-T_1+1}^{t} w_1^{t-s} \sum_{k'} E_{k',all}^* E_{k',all}^T \qquad (12)$$

$$= \begin{cases} T_1 \sum_{k'} E_{k',all}^* E_{k',all}^T, & \text{if } w_1 = 1 \\ \dfrac{1-w_1^{T_1}}{1-w_1} \sum_{k'} E_{k',all}^* E_{k',all}^T, & \text{otherwise} \end{cases}$$

$$D_{all}(t) = \sum_{s=t-T_1+1}^{t} w_1^{t-s} \sum_{k'} E_{k',all}^* \hat{H}(k',s) \qquad (13)$$

Here $F_{k',all} = [1, e^{-j2\pi(T'_s/T_s)k'/N}, e^{-j2\pi 2(T'_s/T_s)k'/N}, \ldots, e^{-j2\pi(P_{max}-1)(T'_s/T_s)k'/N}]^T$.

Note that $R_{all}$ is not time dependent and its inverse can be pre-computed. To avoid an ill-conditioned $R_{all}$ wherein the number of initial fingers is larger than the number of pilots, a small positive value can be added to the diagonal elements of $R_{all}$, for example, as described in A. Ancora, C. Bona, and D. T. M. Slock, "Down-sampled impulse response least-squares channel estimation for LTE OFDMA", IEEE Int. Conf. Acoustics, Speech, and Signal Processing, April 2007. The small positive value may be equal to approximately 1% of the average of the diagonal elements of $R_{all}$, for example.

Alternatively, when only a known number of active fingers are tracked (e.g., only active fingers in $\hat{\alpha}(t)$), the LS solution of equation (7) is given by equation (14).

$$\hat{\alpha}(t) = R^{-1}(t) D(t) \qquad (14)$$

where $$R(t) = \sum_{s=t-T_1+1}^{t} w_1^{t-s} \sum_{k'} E_{k'}^*(t) E_{k'}^T(t) \qquad (15)$$

$$D(t) = \sum_{s=t-T_1+1}^{t} w_1^{t-s} \sum_{k'} E_{k'}^*(t) \hat{H}(k', s) \qquad (16)$$

Here $F_{k'}(t)$ is given by (8b) and its size is smaller than that of $F_{k',all}$.

For finger tracking, $D_{all}(t)$ may be updated continuously. The initial $R(t)$ is equal to $R_{all}$ and $D(t)$ is equal to $D_{all}(t)$. The $R(t)$ matrix can be constructed by removing from $R_{all}$ the rows and columns corresponding to inactive fingers and the $D(t)$ vector can be constructed by removing from $D_{all}(t)$ the elements corresponding to inactive fingers.

This finger tracking implementation may be for active fingers only. As a result, the scheme can provide improved performance because the number of active fingers may be relatively small.

To determine which fingers are active and which are inactive, the system first estimates the energy of each finger using the following equation.

$$\beta_i(t) = (1-\lambda)\beta_i(t-1) + \alpha\lambda|\hat{\alpha}_i(t)|^2 \qquad (17)$$

In equation (17), $\beta_i(t)$ is the energy for the i-th finger at time instant t, $\lambda$ is the weighting factor, and $\hat{\alpha}_i(t)$ is the finger with the associated delay being $iT'_s$. $\hat{\alpha}_i(t)$ from equation (11) is used if that finger is not being tracked or is from (14) otherwise.

To control the dropping of fingers, a threshold $T_{drop}$ is defined to denote the finger drop threshold. If $\beta_i(t)$ is less than $T_{drop}$ for $N_{drop}$ times consecutively, the system drops finger i. To control the addition of fingers, the system defines a threshold $T_{add}$ denoting the finger add threshold. In one implementation, $T_{add}$ is greater than $T_{drop}$ to provide hysteresis control. For example, $T_{add}$ may be 3 dB greater than $T_{drop}$ for providing sufficient hysteresis control. If $\beta_i(t)$ is greater than $T_{add}$ for continuous $N_{add}$ times, the system adds finger i. In one implementation, $N_{add}$ is less then $N_{drop}$ so that any new finger can be added quickly.

In the present system, finger tracking may be used to improve the estimation performance as the number of fingers being tracked is normally relatively small (for example, less than 18) while direct frequency-direction interpolation may have poor performance for channel estimates near the bandedge. By minimizing the number of parameters to be estimated, the system performance can be improved.

In one specific implementation, the parameter selection may be as follows. The sliding window may be selected with values $w_i = 0.999$ and $T_1 = 10$. The maximum possible number of fingers may be set to $P_{max}$. For finger tracking, $\lambda$, $T_{drop}$, $N_{drop}$, $T_{add}$, $N_{add}$ can be determined using an appropriate simulation. Again, as described above, adaptive recursive least squares (RLS) or Kalman algorithms can be used to estimate the filter coefficients. With the cost function defined in equation (7), a generalized RLS can be used.

In an alternative implementation of the present three-stage channel estimation scheme, channel estimation is performed in the frequency direction first (e.g., along a time interval) before being performed in the time direction (e.g., along a frequency interval). Accordingly, the second and third stages of the scheme described above may be performed in reverse order with the channel estimates generated by the frequency-direction interpolation being used as inputs for time-direction interpolation. With reference to FIG. 2, therefore, stage 156 may be performed before stage 154.

Pilot Location Estimates

In the present implementation, the first stage performs channel estimation at the pilot symbol locations and is implemented as shown in FIG. 2 and described above. For example, the channel estimation may be performed at the pilot locations within a subframe or frequency interval and can use the sliding window filter described above.

Frequency-Direction Interpolation

Figure 5:
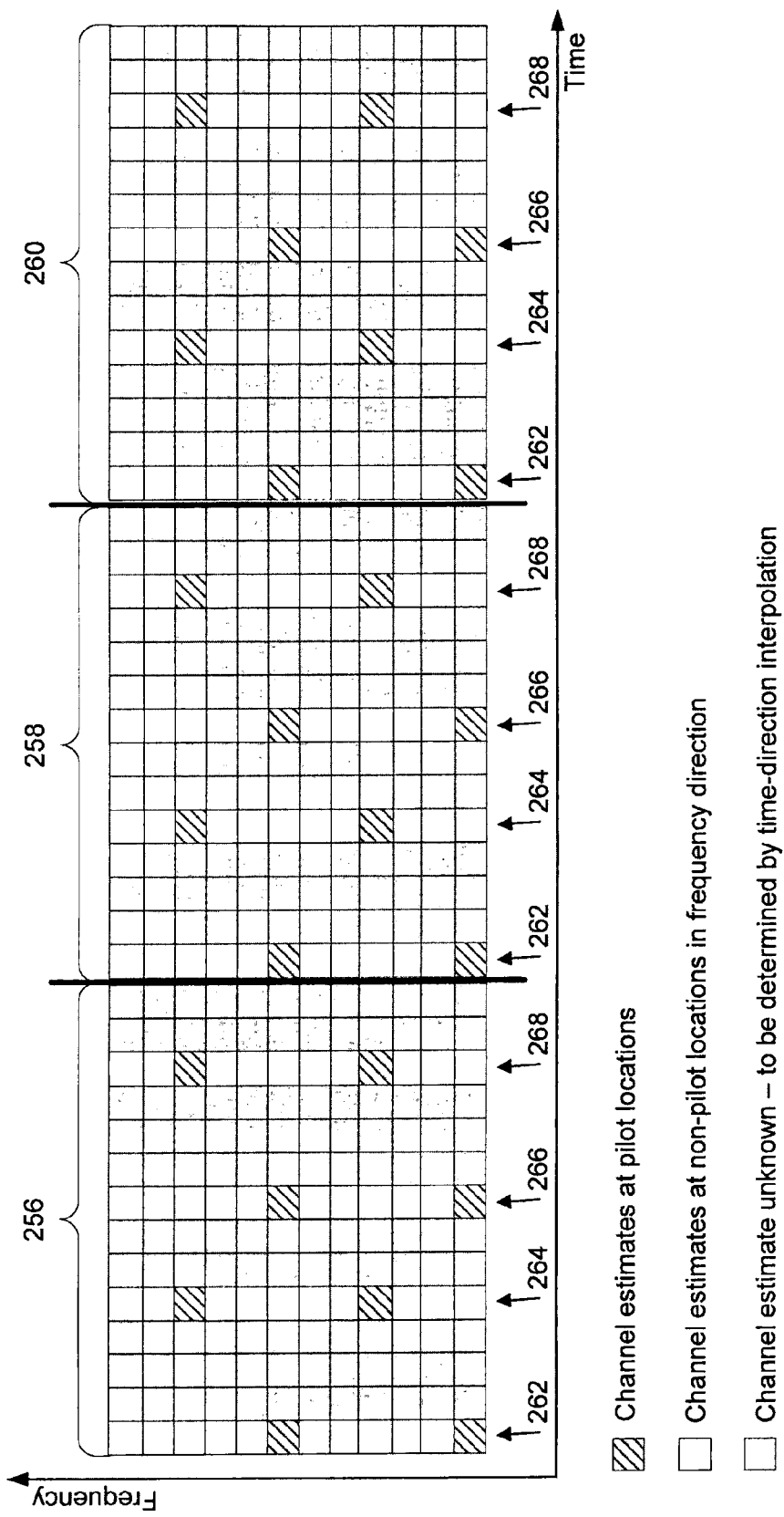
FIG. 5 is an illustration showing the location of resource elements for which channel estimates have been determined in three subframes after performing the frequency-direction interpolation in the second stage of an alternative implementation of the channel estimation scheme.

After performing channel estimation at the pilot locations, in the second stage of the present implementation, frequency-direction interpolation is performed using the pilot location channel estimates from the first stage. In frequency-direction interpolation, channel estimation is performed throughout each OFDM symbol interval or time interval that carries a pilot symbol. In the case of LTE with normal cyclic prefix (i.e., 14 OFDM symbols per subframe), as shown in FIG. 5, frequency-domain interpolation is performed for those OFDM symbols or at time intervals that correspond to symbols 262, 264, 266, and 268.

When performing frequency-direction interpolation, for each OFDM symbol containing pilot symbols, in the present implementation there are two existing channel estimates within every 12 subcarriers per symbol—the estimates at the pilot symbol locations. As a result, the interpolation estimates the channel impulse response using only those existing channel estimates. The system then converts the estimated channel impulse response to the frequency domain.

For frequency-direction interpolation, the finger-tracking scheme may be implemented as described above. The LS solution from equations (11) through (13) can be used to perform frequency-direction interpolation along one or more time interval, however, because there is only one channel estimate per six subcarriers in the present implementation (as opposed to one channel estimate per three subcarriers when frequency-direction interpolation is performed after time-direction interpolation), the equations are modified. Specifically, the matrices $R_{all}$ and $D_{all}$ are modified, as shown by equations (18) and (19). In equation (18), $R_{all}$ for antenna 1 and 2 is dependent upon time t and is, consequently, denoted by $R_{all}(t)$. As shown in equation (18), for antennas 1 and 2, the value of $R_{all}(t)$ alternates between two values (as the pilot pattern alternates. For the same reason, at time instant t, $R_{all}(t)$ for antenna 1 is not the same as that for antenna 2).

$$R_{all}(t) = \sum_{s=t-T_1+1}^{t} w_1^{t-s} \sum_{k'} E_{k'(s),all}^* E_{k'(s),all}^T \quad (18)$$

$$D_{all}(t) = \sum_{s=t-T_1+1}^{t} w_1^{t-s} \sum_{k'} E_{k'(s),all}^* \hat{H}(k'(s), s) \quad (19)$$

In equations (18) and (19), the "s" symbol refers to the pilot OFDM symbols (i.e., the OFDM symbols that carry the pilots). In contrast, in equations (12) and (13), the symbol "s" refers to each OFDM symbol regardless of whether the symbol contains a pilot. For example, for normal cyclic prefix implementations, with reference to FIG. 5, "s" refers to OFDM symbols 262, 264, 266, and 268. In equations (18) and (19), if "s" refers to a pilot OFDM symbol, "s+1" refers to the next OFDM symbol that contains a pilot symbol, not just the next OFDM symbol.

Also, in equations (18) and (19), the symbol k' is replaced with k'(s). In contrast to equations (12) and (13), where k' denotes the pilot subcarrier index (where there exists one pilot subcarrier per three subcarriers), in equations (18) and (19) k'(s) is a function of the OFDM symbol index and k'(s) denotes the pilot subcarrier index at the given pilot OFDM symbol interval or time interval (with one pilot subcarrier per six subcarriers or frequency intervals), with the indices being shifted by three subcarriers from one pilot OFDM symbol to the next. As such, the pilot subcarrier index in this implementation is a function of "s".

When tracking a known number of fingers (i.e., P fingers), equations (15) and (16) described above may be similarly modified. The modified equations are provided as equations (20) and (21).

$$R(t) = \sum_{s=t-T_1+1}^{t} w_1^{t-s} \sum_{k'} E_{k'(s)}^*(t) E_{k'(s)}^T(t) \quad (20)$$

$$D(t) = \sum_{s=t-T_1+1}^{t} w_1^{t-s} \sum_{k'} E_{k'(s)}^*(t) \hat{H}(k'(s), s) \quad (21)$$

In equations (20) and (21), the "s" symbol refers to the pilot OFDM symbols (i.e., the OFDM symbols that carry the pilots). For example, for normal cyclic prefix implementations, with reference to FIG. 5, "s" refers to OFDM symbols 262, 264, 266, and 268. In equations (20) and (21), if "s" refers to a pilot OFDM symbol, "s+1" refers to the next OFDM symbol that contains a pilot symbol, not just the next OFDM symbol.

Also, in equations (20) and (21), the symbol k' is replaced with k'(s). k'(s) is a function of the OFDM symbol index and k'(s) denotes the pilot subcarrier index at the given pilot OFDM symbol (with one pilot subcarrier per six subcarriers), with the indices being shifted by three subcarriers from one pilot OFDM symbol to the next. As such, the pilot subcarrier index in this implementation is a function of "s".

FIG. 5 is an illustration showing three subframes 256, 258 and 260 after performing the frequency-direction interpolation in the second stage of the present implementation. As shown in FIG. 5, channel estimates have been determined at each pilot location, and for each OFDM symbol or time interval containing a pilot symbol. In some cases, the configuration of the subframes shown in FIG. 5 is modified; alternative subframe configurations may use a different number of OFDM symbols and/or subcarriers, for example.

Time-Direction Interpolation

After performing the second stage frequency-direction interpolation, in the present scheme, time-direction interpolation is performed in the third stage. The time-direction interpolation may be implemented as described above using the low-pass filter illustrated in FIG. 3. In this implementation, however, the time-direction interpolation is performed for each subcarrier or frequency interval, rather than only a subset of subcarriers or frequency intervals.

In the present implementation, because the frequency-direction interpolation has already been performed before time-direction interpolation is performed, additional channel estimates are available for time-direction interpolation in each subcarrier or frequency interval.

In some cases, time-direction interpolation may be performed for particular fingers. In that case, the time-direction interpolation is performed based on the multi-path fingers tracked from the second stage. As a result, fingers are interpolated for non-pilot OFDM symbols or at time intervals where no pilot symbols are transmitted. For each non-pilot OFDM symbol or at time interval where no pilot symbols are transmitted, the interpolated fingers are converted back to the frequency domain via a Fast Fourier Transform (FFT) to complete the time-direction interpolation.

As the number of fingers being tracked can be small and the FFT is efficient, this type of time-direction interpolation may be relatively efficient to implement.

Figure 6:
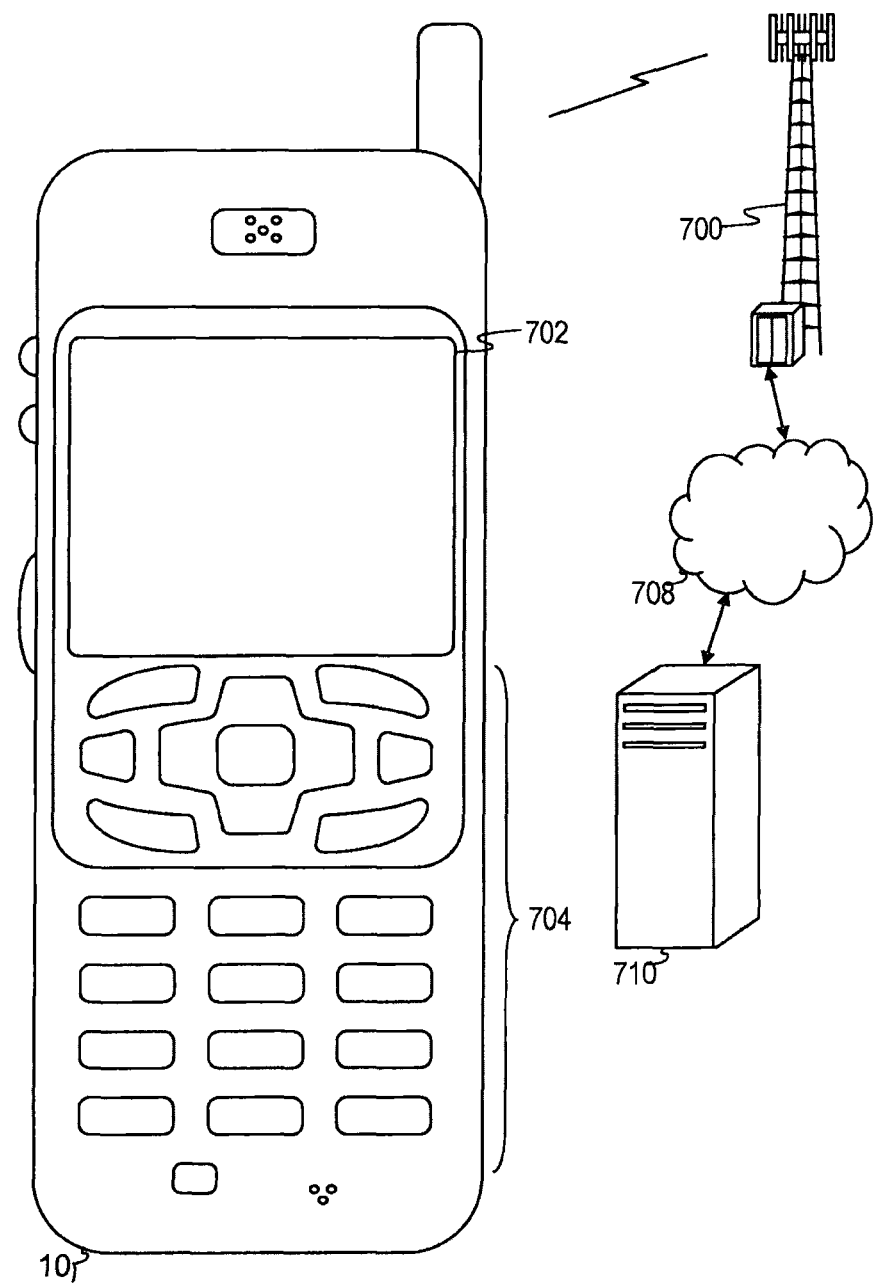
FIG. 6 is a diagram of a wireless communications system including a UE operable for some of the various embodiments of the disclosure.

FIG. 6 illustrates a wireless communications system including an embodiment of UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 7:
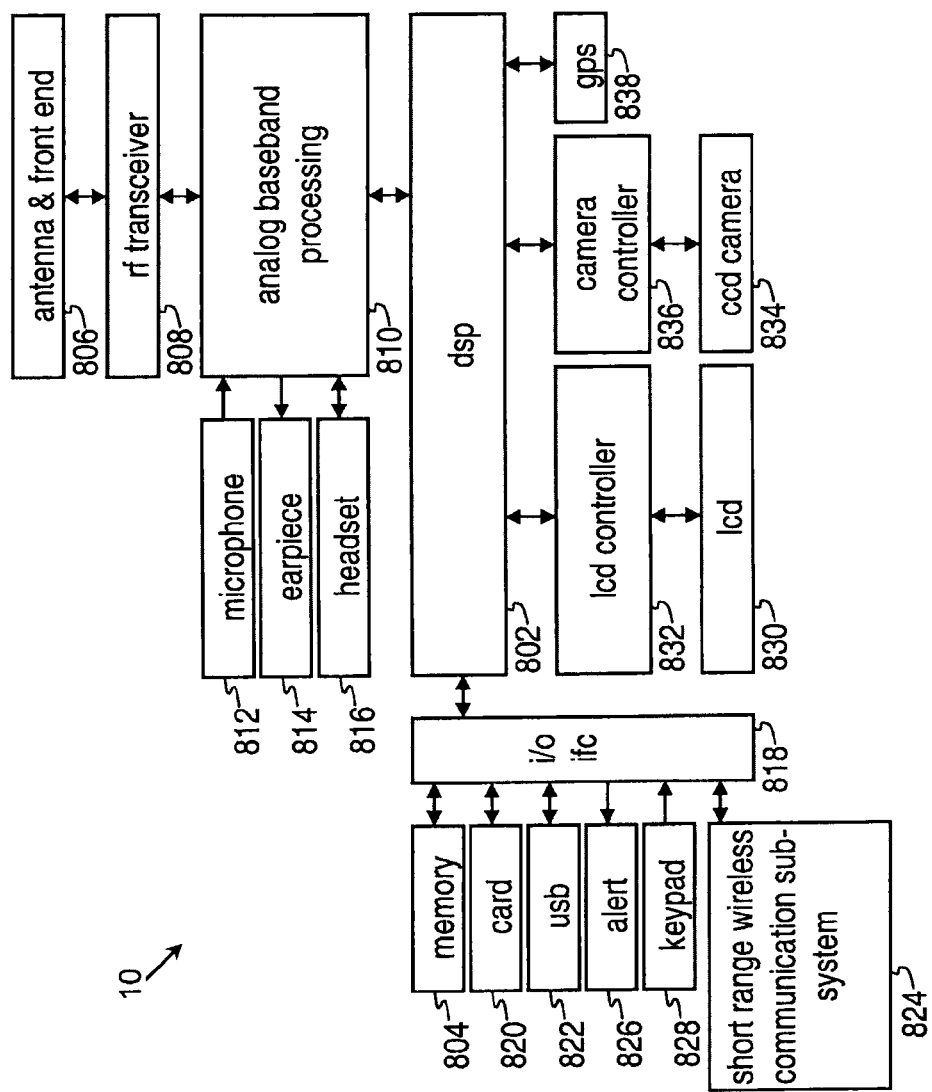
FIG. 7 is a block diagram of a UE operable for some of the various embodiments of the disclosure.

FIG. 7 shows a block diagram of the UE 10. While a variety of known components of UEs 10 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UE 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 8:
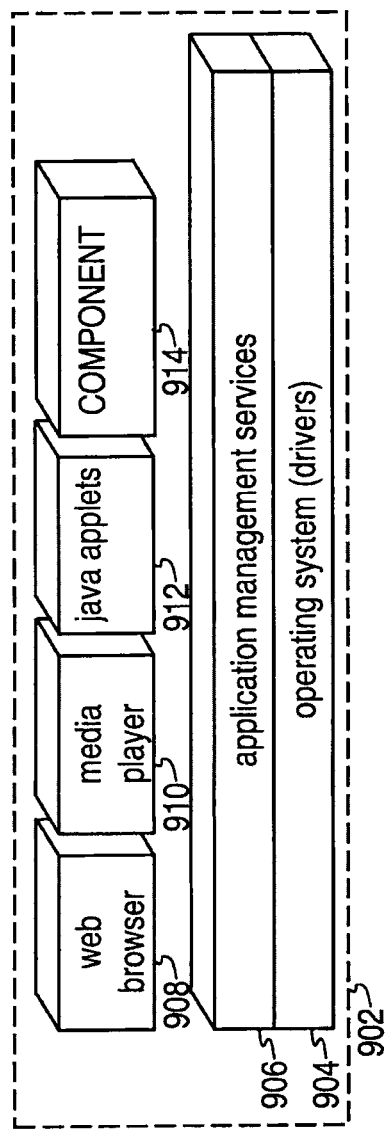
FIG. 8 is a diagram of a software environment that may be implemented on a UE operable for some of the various embodiments of the disclosure.

FIG. 8 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services ("AMS") 906 that transfer control between applications running on the UE 10. Also shown in FIG. 8 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audio-visual media. The Java applets 912 configure the UE 10 to provide games, utilities, and other functionality. A component 914 might provide functionality described herein.

Figure 9:
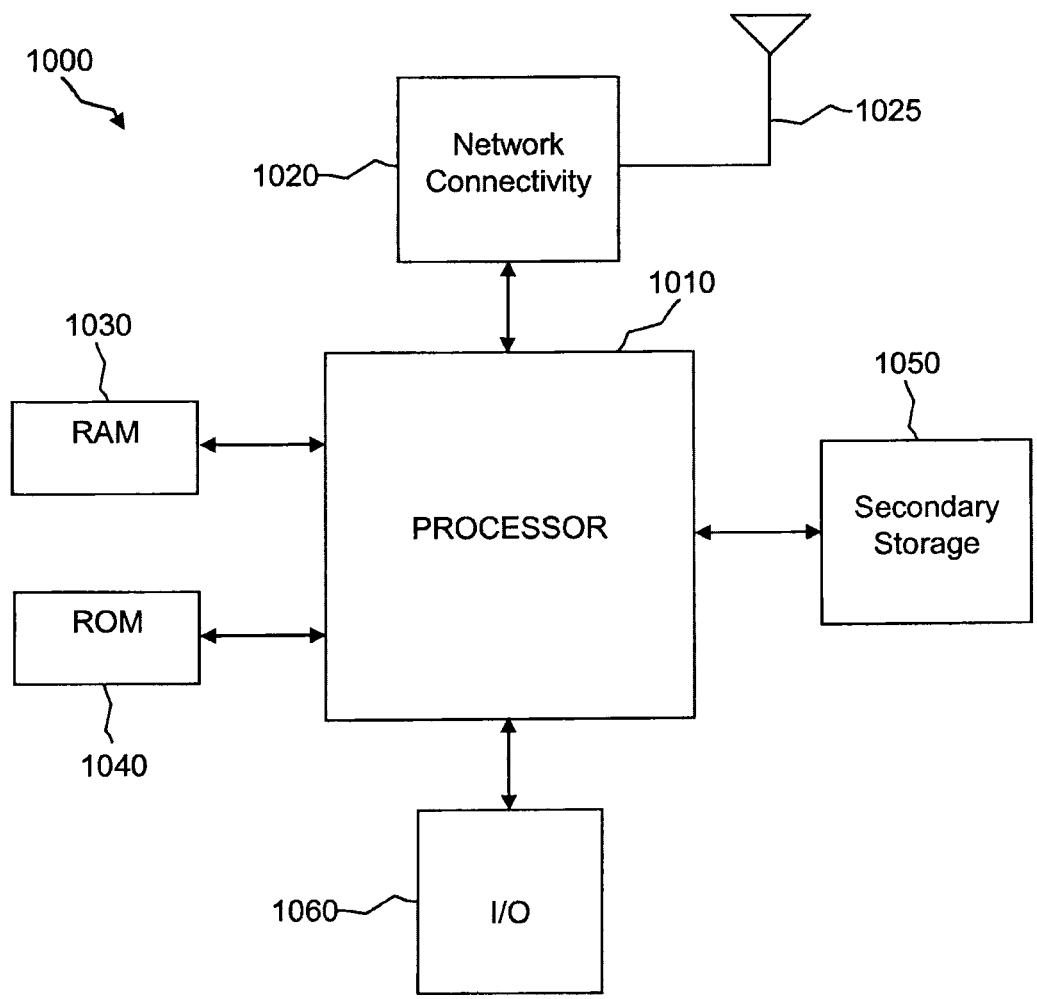
FIG. 9 is an illustrative general purpose computer system suitable for some of the various embodiments of the disclosure.

The UE 10, wireless network or system 700, and other components described above might include a processing component that is capable of executing instructions related to the actions described above. FIG. 9 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by the processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made.

What is claimed is:

1. A method for channel estimation, the method comprising: receiving data at a number of frequency intervals in a frequency band over a number of first time intervals, each frequency interval and each first time interval comprising a portion of the data, and a number of the data portions comprising pilot symbols; identifying a first channel estimate for each pilot symbol within the data over a second time interval comprising at least one first time interval, the first channel estimate comprising a first set of channel estimates; determining a first set of filter coefficients using the first channel estimate, and a noise estimate; generating a second set of channel estimates for each pilot symbol within the data over the second time interval comprising at least one first time interval using the first set of filter coefficients; performing one of time-direction interpolation and frequency-direction interpolation to determine a third set of channel estimates for a number of data portions in a frequency interval using the second set of channel estimates, the frequency interval comprising a data portion comprising a pilot symbol; and performing the other of time-direction interpolation and frequency-direction interpolation to determine a fourth set of channel estimates for each first time interval using at least one of (a) the second set of channel estimates and (b) the third set of channel estimates.

2. The method of claim 1, wherein performing the time-direction interpolation includes: inserting zeros into channel estimates for each of a plurality of non-pilot locations within each frequency interval containing the pilot symbol; and using a low-pass filter to interpolate the third set of channel estimates in the time-direction.

3. The method of claim 2, wherein a cut-off frequency of the low-pass filter is greater than a maximum Doppler frequency shift of the data.

4. The method of claim 1, including using a sliding window to determine the first set of channel estimates, and wherein a forgetting factor of the sliding window is less than or equal to 1.

5. The method of claim 1, wherein the frequency-direction interpolation is performed after the time-direction interpolation, and performing the frequency-direction interpolation includes: identifying a plurality of active fingers used to receive the data; and performing the frequency-direction interpolation based on each of the active fingers.

6. The method of claim 5, wherein identifying a plurality of active fingers, includes using a finger time spacing larger than or equal to a nominal sampling interval used in a fast Fourier transform processing.

7. The method of claim 6, wherein each active finger has an energy exceeding a first energy threshold for a first time period, and when the energy of a first one of the active fingers falls below a second energy threshold for a second time period, the first one of the active fingers is dropped.

8. The method of claim 1, wherein the time-direction interpolation is performed after the frequency-direction interpolation, and wherein performing the time-direction interpolation includes: identifying a plurality of active fingers used to receive the data; performing the time-direction interpolation based on each of the active fingers; and converting time-domain fingers to frequency-domain channel estimates via a fast Fourier transform processing.

9. The method of claim 1, wherein the method is performed by a user equipment.

10. The method of claim 1, wherein the method is performed by a network component.

11. A user equipment for channel estimation, comprising: a processor, the processor being configured to: receive data at a number of frequency intervals in a frequency band over a number of first time intervals, each frequency interval and each first time interval comprising a portion of the data, and a number of the data portions comprising pilot symbols; identify a first channel estimate for each pilot symbol within the data over a second time interval comprising at least one first time interval, the first channel estimate comprising a first set of channel estimates; determine a first set of filter coefficients using the first channel estimate, and a noise estimate; generate a second set of channel estimates for each pilot symbol within the data over the second time interval comprising at least one first time interval using the first set of filter coefficients; perform one of time-direction interpolation and frequency-direction interpolation to determine a third set of channel estimates for a number of data portions in a frequency interval using the second set of channel estimates, the frequency interval comprising a data portion comprising a pilot symbol; and perform the other of time-direction interpolation and frequency-direction interpolation to determine a fourth set of channel estimates for each first time interval using at least one of (a) the second set of channel estimates and (b) the third set of channel estimates.

12. The user equipment of claim 11, wherein, when performing the time-direction interpolation, the processor is configured to: insert zeros into channel estimates for each of a plurality of non-pilot locations within each frequency interval containing the pilot symbol; and use a low-pass filter to interpolate the third set of channel estimates in the time-direction.

13. The user equipment of claim 12, wherein a cut-off frequency of the low-pass filter is greater than a maximum Doppler frequency shift of the data.

14. The user equipment of claim 11, wherein the processor is configured to use a sliding window to determine the first set of channel estimates, and wherein a forgetting factor of the sliding window is less than or equal to 1.

15. The user equipment of claim 11, wherein the processor is configured to: identify a plurality of active fingers used to receive the data; and perform the frequency-direction interpolation based on each of the active fingers.

16. The user equipment of claim 15, wherein the processor is configured to use a finger time spacing larger than or equal to a nominal sampling interval used in a fast Fourier transform processing.

17. The user equipment of claim 16, wherein each active finger has an energy exceeding a first energy threshold for a first time period, and when the energy of a first one of the active fingers falls below a second energy threshold for a second time period, the processor is configured to drop the first one of the active fingers.

18. The user equipment of claim 11, wherein the time-direction interpolation is performed after the frequency-direction interpolation, and the processor is configured to: identify a plurality of active fingers used to receive the data; perform the time-direction interpolation based on each of the active fingers; and convert time-domain fingers to frequency-domain channel estimates via a fast Fourier transform processing.

19. A network component for channel estimation, comprising: a processor, the processor being configured to: receive data at a number of frequency intervals in a frequency band over a number of first time intervals, each frequency interval and each first time interval comprising a portion of the data, and a number of the data portions comprising pilot symbols; identify a first channel estimate for each pilot symbol within the data over a second time interval comprising at least one first time interval, the first channel estimate comprising a first set of channel estimates; determine a first set of filter coefficients using the first channel estimate, and a noise estimate; generate a second set of channel estimates for each pilot symbol within the data over the second time interval comprising at least one first time interval using the first set of filter coefficients; perform one of time-direction interpolation and frequency-direction interpolation to determine a third set of channel estimates for a number of data portions in a frequency interval using the second set of channel estimates, the frequency interval comprising a data portion comprising a pilot symbol; and perform the other of time-direction interpolation and frequency-direction interpolation to determine a fourth set of channel estimates for each first time interval using at least one of (a) the second set of channel estimates and (b) the third set of channel estimates.

20. The network component of claim 19, wherein, when performing the time-direction interpolation, the processor is configured to: insert zeros into channel estimates for each of a plurality of non-pilot locations within each frequency interval containing the pilot symbol; and use a low-pass filter to interpolate the third set of channel estimates in the time-direction.

21. The network component of claim 20, wherein a cut-off frequency of the low-pass filter is greater than a maximum Doppler frequency shift of the data.

22. The network component of claim 19, wherein the processor is configured to use a sliding window to determine the first set of channel estimates, and wherein a forgetting factor of the sliding window is less than or equal to 1.

23. The network component of claim 19, wherein the processor is configured to: identify a plurality of active fingers used to receive the data; and perform the frequency-direction interpolation based on each of the active fingers.

24. The network component of claim 23, wherein the processor is configured to use a finger time spacing larger than or equal to a nominal sampling interval used in a fast Fourier transform processing.

25. The network component of claim 24, wherein each active finger has an energy exceeding a first energy threshold for a first time period, and when the energy of a first one of the active fingers falls below a second energy threshold for a second time period, the processor is configured to drop the first one of the active fingers.

26. The network component of claim 19, wherein the time-direction interpolation is performed after the frequency-direction interpolation, and the processor is configured to: identify a plurality of active fingers used to receive the data; perform the time-direction interpolation based on each of the active fingers; and convert time-domain fingers to frequency-domain channel estimates via a fast Fourier transform processing.

* * * * *

UNITED STATES PATENT AND TRADEMARK OFFICE
CERTIFICATE OF CORRECTION

PATENT NO. : 8,520,781 B2  
APPLICATION NO. : 12/846448  
DATED : August 27, 2013  
INVENTOR(S) : Weng et al.

Page 1 of 4

It is certified that error appears in the above-identified patent and that said Letters Patent is hereby corrected as shown below:

In the Specification

Column 14, Eq. (7),

"
$$J(\hat{\alpha}(\tau;t)) = \sum_{s=t-T_1+1}^{t} w_1^{t-s} \sum_{k'} |\hat{H}(k',s) - \sum_{p=0}^{P-1} \alpha_p(t) e^{-j2\pi\tau_p(T_s'/T_s)k'/N}|^2$$
$$= \sum_{s=t-T_1+1}^{t} w_1^{t-s} \sum_{k'} |\hat{H}(k',s) - \underline{\hat{\alpha}}^T(t)\underline{F}_{k'}(t)|^2$$
"

should be

--
$$J(\hat{\alpha}(\tau;t)) = \sum_{s=t-T_1+1}^{t} w_1^{t-s} \sum_{k'} |\hat{H}(k',s) - \sum_{p=0}^{P-1} \alpha_p(t) e^{-j2\pi\tau_p(T_s'/T_s)k'/N}|^2$$
$$= \sum_{s=t-T_1+1}^{t} w_1^{t-s} \sum_{k'} |\hat{H}(k',s) - \underline{\hat{\alpha}}^T(t)\underline{F}_{k'}(t)|^2$$
--.

Signed and Sealed this  
Twenty-sixth Day of November, 2013

Margaret A. Focarino  
*Commissioner for Patents of the United States Patent and Trademark Office*

Column 15, Eq. (12), $$R_{all} = \sum_{s=t-T_1+1}^{t} w_1^{t-s} \sum_{k'} \underline{F}_{k',all}^* \underline{F}_{k',all}^T$$

$$= \begin{cases} T_1 \sum_{k'} \underline{F}_{k',all}^* \underline{F}_{k',all}^T, & \text{if } w_1 = 1 \\ \frac{1-w_1^{T_1}}{1-w_1} \sum_{k'} \underline{F}_{k',all}^* \underline{F}_{k',all}^T, & \text{otherwise} \end{cases}$$

" " should be $$R_{all} = \sum_{s=t-T_1+1}^{t} w_1^{t-s} \sum_{k'} \underline{F}_{k',all}^* \underline{F}_{k',all}^T$$

$$= \begin{cases} T_1 \sum_{k'} \underline{F}_{k',all}^* \underline{F}_{k',all}^T, & \text{if } w_1 = 1 \\ \frac{1-w_1^{T_1}}{1-w_1} \sum_{k'} \underline{F}_{k',all}^* \underline{F}_{k',all}^T, & \text{otherwise} \end{cases}$$

-- --.

Column 15, Eq. (13), $$D_{all}(t) = \sum_{s=t-T_1+1}^{t} w_1^{t-s} \sum_{k'} \underline{F}_{k',all}^* \hat{H}(k',s)$$

" " should be $$D_{all}(t) = t \sum_{s=t-T_1+1}^{t} w_1^{t-s} \sum_{k'} \underline{F}_{k',all}^* \hat{H}(k',s)$$

-- --.

Column 15, Eq. (15), $$R(t) = \sum_{s=t-T_1+1}^{t} w_1^{t-s} \sum_{k'} \underline{F}_{k'}^*(t) \underline{F}_{k'}^T(t)$$

" " should be $$R(t) = \sum_{s=t-T_1+1}^{t} w_1^{t-s} \sum_{k'} \underline{F}_{k'}^*(t) \underline{F}_{k'}^T(t)$$

-- --.

CERTIFICATE OF CORRECTION (continued)
U.S. Pat. No. 8,520,781 B2

Page 3 of 4

Column 16, Eq. (16),

" $$D(t) = \sum_{s=t-T_1+1}^{t} w_1^{t-s} \sum_{k'} \underline{F}_{k'}^{*}(t) \hat{H}(k',s)$$ "

should be

-- $$D(t) = \sum_{s=t-T_1+1}^{t} w_1^{t-s} \sum_{k'} \underline{F}_{k'}^{*}(t) \hat{H}(k',s)$$ --.

Column 17, Eq. (18),

" $$R_{all}(t) = \sum_{s=t-T_1+1}^{t} w_1^{t-s} \sum_{k'} \underline{F}_{k'(s),all}^{*} \underline{F}_{k'(s),all}^{T}$$ "

should be

-- $$R_{all}(t) = \sum_{s=t-T_1+1}^{t} w_1^{t-s} \sum_{k'} \underline{F}_{k'(s),all}^{*} \underline{F}_{k'(s),all}^{T}$$ --

Column 17, Eq. (19),

" $$D_{all}(t) = \sum_{s=t-T_1+1}^{t} w_1^{t-s} \sum_{k'} \underline{F}_{k'(s),all}^{*} \hat{H}(k'(s),s)$$ "

should be

-- $$D_{all}(t) = \sum_{s=t-T_1+1}^{t} w_1^{t-s} \sum_{k'} \underline{F}_{k'(s),all}^{*} \hat{H}(k'(s),s)$$ --.

Column 17, Eq. (20),

" $$R(t) = \sum_{s=t-T_1+1}^{t} w_1^{t-s} \sum_{k'} \underline{F}_{k'(s)}^{*}(t) \underline{F}_{k'(s)}^{T}(t)$$ "

should be

-- $$R(t) = \sum_{s=t-T_1+1}^{t} w_1^{t-s} \sum_{k'} \underline{F}_{k'(s)}^{*}(t) \underline{F}_{k'(s)}^{T}(t)$$ --.

Column 17, Eq. (21),

" $$D(t) = \sum_{s=t-T_1+1}^{t} w_1^{t-s} \sum_{k'} \underline{F}_{k'}^{*}(s)(t)\hat{H}(k'(s),s)$$ "

should be

-- $$D(t) = \sum_{s=t-T_1+1}^{t} w_1^{t-s} \sum_{k'} \underline{F}_{k'}^{*}(s)(t)\hat{H}(k'(s),s)$$ --.